(12) United States Patent
Yamanaka et al.

(10) Patent No.: US 10,298,091 B2
(45) Date of Patent: May 21, 2019

(54) ROTOR OF ROTATING MOTOR, ROTATING MOTOR, AND AIR-CONDITIONING APPARATUS

(71) Applicant: Mitsubishi Electric Corporation, Tokyo (JP)

(72) Inventors: Hiroshi Yamanaka, Tokyo (JP); Hironori Yabuuchi, Tokyo (JP); Ryo Nabika, Tokyo (JP); Takashi Yamaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 15/324,279

(22) PCT Filed: Oct. 22, 2014

(86) PCT No.: PCT/JP2014/078060
§ 371 (c)(1),
(2) Date: Jan. 6, 2017

(87) PCT Pub. No.: WO2016/063371
PCT Pub. Date: Apr. 28, 2016

(65) Prior Publication Data
US 2017/0201153 A1    Jul. 13, 2017

(51) Int. Cl.
*H02K 1/30* (2006.01)
*H02K 7/04* (2006.01)
(Continued)

(52) U.S. Cl.
CPC ............. *H02K 7/04* (2013.01); *F24F 1/0007* (2013.01); *H02K 1/30* (2013.01); *H02K 7/14* (2013.01)

(58) Field of Classification Search
CPC ............ H02K 1/22; H02K 1/27; H02K 21/14; H02K 1/30; H02K 7/04; H02K 7/14; F24F 1/0007
(Continued)

(56) References Cited

U.S. PATENT DOCUMENTS

| 2010/0283351 | A1* | 11/2010 | Tsumagari | ........... H01Q 9/0414 |
| | | | | 310/216.043 |
| 2013/0119806 | A1* | 5/2013 | Watanabe | ............ H02K 5/1732 |
| | | | | 310/156.01 |
| 2013/0285498 | A1* | 10/2013 | Yang | ........................ H02K 1/27 |
| | | | | 310/156.12 |

FOREIGN PATENT DOCUMENTS

| JP | S62-221850 A | 9/1987 |
| JP | H10-136596 A | 5/1998 |

(Continued)

OTHER PUBLICATIONS

Office Action dated Sep. 19, 2017 issued in corresponding JP patent application No. 2016-554998 (and English translation).
(Continued)

*Primary Examiner* — Quyen P Leung
*Assistant Examiner* — Minki Chang
(74) *Attorney, Agent, or Firm* — Posz Law Group, PLC

(57) ABSTRACT

A rotor of a rotating motor includes a boss into which a shaft is inserted, a rotor yoke provided on a side of an outer circumference of the boss and formed of a plurality of pole pieces connected into a circular ring shape, and a coupling member made of resin with which the boss and the rotor yoke are integrally molded. Each of the plurality of pole pieces is provided with an injection hole that is bored in an axial direction and into which the resin is injected in the integral molding.

8 Claims, 8 Drawing Sheets

(51) Int. Cl.
*H02K 7/14* (2006.01)
*F24F 1/0007* (2019.01)

(58) Field of Classification Search
USPC .... 310/156.08, 156.12, 156.22, 156.28, 400, 310/402, 418
See application file for complete search history.

(56) References Cited

FOREIGN PATENT DOCUMENTS

| | | |
|---|---|---|
| JP | 2002-262496 A | 9/2002 |
| JP | 2004-328970 A | 11/2004 |
| JP | 2009-130966 A | 6/2009 |
| JP | 2011-147255 A | 7/2011 |
| JP | 2012-130103 A | 7/2012 |
| JP | 2013-143805 A | 7/2013 |

OTHER PUBLICATIONS

International Search Report of the International Searching Authority dated Jan. 6, 2015 for the corresponding International application No. PCT/JP2014/078060 (and English translation).

* cited by examiner

ROTOR OF ROTATING MOTOR, ROTATING MOTOR, AND AIR-CONDITIONING APPARATUS

CROSS REFERENCE TO RELATED APPLICATION

This application is a U.S. national stage application of PCT/JP2014/078060 filed on Oct. 22, 2014, the contents of which are incorporated herein by reference.

TECHNICAL FIELD

The present invention relates to a rotor of a rotating motor mounted on various types of electric apparatuses, a rotating motor, and an air-conditioning apparatus.

BACKGROUND ART

For devices such as a fan motor in an outdoor unit of an air-conditioning apparatus, the efficiency has been enhanced in response to a demand for energy saving, and AC motors have been increasingly replaced with brushless DC motors. The brushless DC motor employs a configuration in which, to avoid electrical corrosion of a bearing due to current caused at a shaft as an axis, a rotor core of a rotating motor is divided into inner and outer cores, and an elastic body is inserted into an annular clearance left between the inner and outer cores (for example, Patent Literature 1).

Circular ring-shaped iron core pieces forming the outer core in Patent Literature 1 are formed by continuously punching out the iron core pieces from a band-shaped steel sheet material, leading to a poor material yield rate. For this reason, for a core structure of the rotating motor, a method has been also employed in which concave and convex portions provided at end surfaces of adjacent ones of a plurality of fan-shaped divided cores in the circumferential direction of the divided cores are fitted together, and then, an annular rotor iron core is integrally formed using an elastic body (for example, Patent Literature 2).

CITATION LIST

Patent Literature

Patent Literature 1: Japanese Unexamined Patent Application Publication No. 2009-130966
Patent Literature 2: Japanese Unexamined Patent Application Publication No. 2002-262496

SUMMARY OF INVENTION

Technical Problem

However, when the fan-shaped divided cores are combined together and the annular rotor iron core is integrally formed using the elastic body made of resin as described in Patent Literature 2, cylindrical accuracy of a rotor yoke is lowered due to contraction of the elastic body in integral molding, leading to poor rotation balance of the rotor. Thus, this unstable rotation causes vibration and noise.

The present invention has been made in view of the above-described problems, and is intended to provide a rotor of a rotating motor capable of reducing rotor deformation due to resin contraction in integral molding, a rotating motor, and an air-conditioning apparatus.

Solution to Problem

A rotor of a rotating motor of an embodiment of the present invention includes a boss into which a shaft is inserted, a rotor yoke provided on a side of an outer circumference of the boss and formed of a plurality of pole pieces connected into a circular ring shape, and a coupling member made of resin with which the boss and the rotor yoke are integrally molded. Each of the plurality of pole pieces is provided with an injection hole that is bored in an axial direction and into which the resin is injected in the integral molding.

Advantageous Effects of Invention

In the embodiment of the present invention, each of the plurality of pole pieces constituting the rotor yoke is provided with the injection hole bored in the axial direction, and the resin is injected into the injection hole in integral molding of the boss and the rotor yoke. Thus, in integral molding, not only stress due to resin contraction on a side of an inner diameter but also stress due to contraction of resin filling the injection hole act on each of the plurality of pole pieces. Consequently, deformation of the rotor due to resin contraction of the coupling member can be reduced.

DESCRIPTION OF EMBODIMENTS

Embodiment

Figure 1:
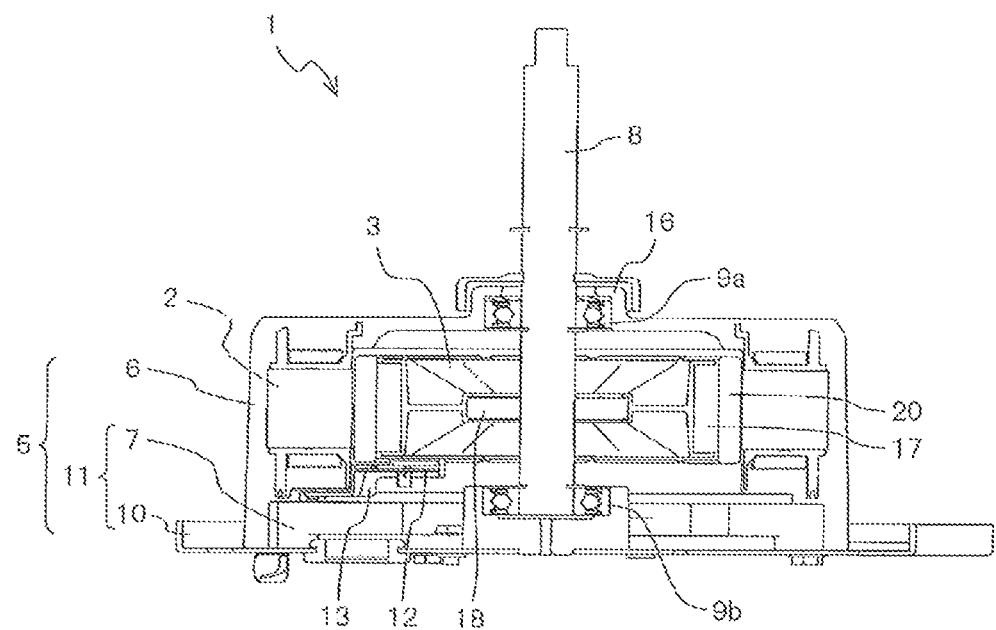
FIG. 1 is a schematic end view of a rotating motor of Embodiment of the present invention.

FIG. 1 illustrates a rotating motor 1 of Embodiment. As illustrated in FIG. 1, the rotating motor 1 is formed of, for example, a brushless DC motor, and includes a cylindrical stator 2, a rotor 3 as a rotor iron core, a motor housing 5 in which a housing space housing the rotor 3 is formed, and a printed circuit board 12 on which a hall element configured to detect the magnetic pole position of the rotor 3 is mounted.

Although the illustration is omitted in FIG. 1, the stator 2 includes stator pole pieces each formed of a plurality of magnetic steel sheets stacked on each other, coils through which current supplied from a power source flows, and insulators provided at the stator pole pieces and utilized for insulation of the coils. The stator 2 is formed of the stator pole pieces, each attached with the insulator, arranged into a circular ring shape. The coil is wound around the stator pole piece attached with the insulator. A casing 6 is formed of mold resin injected into a preset-shaped mold in which the stator 2 is placed.

The motor housing 5 includes the cylindrical casing 6 with a closed bottom, and a bracket cover 11 having a bearing housing 7 and a metal plate cover 10. An opening of the casing 6 is covered with the bearing housing 7 and the metal plate cover 10. The motor housing 5 is integrally fixed using mold resin in the state in which an inner circumferential surface of the stator 2 is exposed at an inner surface of the casing 6. Also, the motor housing 5 is provided with a first bearing 9a and a second bearing 9b. The first bearing 9a is attached to a bottom wall portion 16 of the casing 6, and the second bearing 9b is attached to the bearing housing 7. The casing 6 and the bearing housing 7 are formed of mold resin including, for example, thermosetting resin such as unsaturated polyester.

The rotor 3 is, on the inner side of the cylindrical stator 2 in the radial direction of the cylindrical stator 2, disposed concentrically with the stator 2. The rotor 3 is fixed by press-fitting a shaft 8 into the rotor 3, and the shaft 8 is rotatably supported by the motor housing 5 through the first bearing 9a and the second bearing 9b. The printed circuit board 12 is, by, for example, welding, fixed to a board holder 13 disposed between an end surface of the rotor 3 and the bearing housing 7.

Figure 2A:
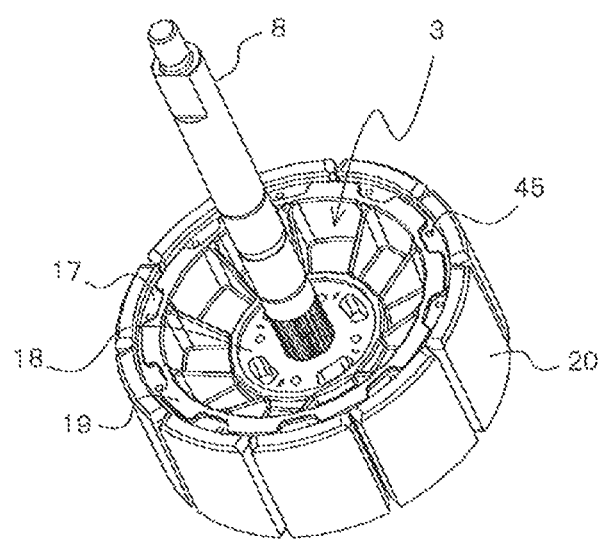
FIG. 2A is a perspective view in the state in which magnets are bonded to the circumference of a rotor of FIG. 1 and a shaft is inserted.
Figure 2B:
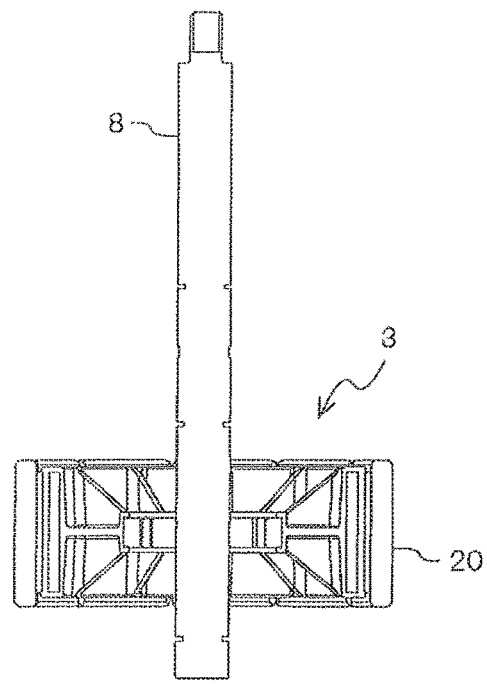
FIG. 2B is a schematic end view of the rotor in the state of FIG. 2A.
Figure 3A:
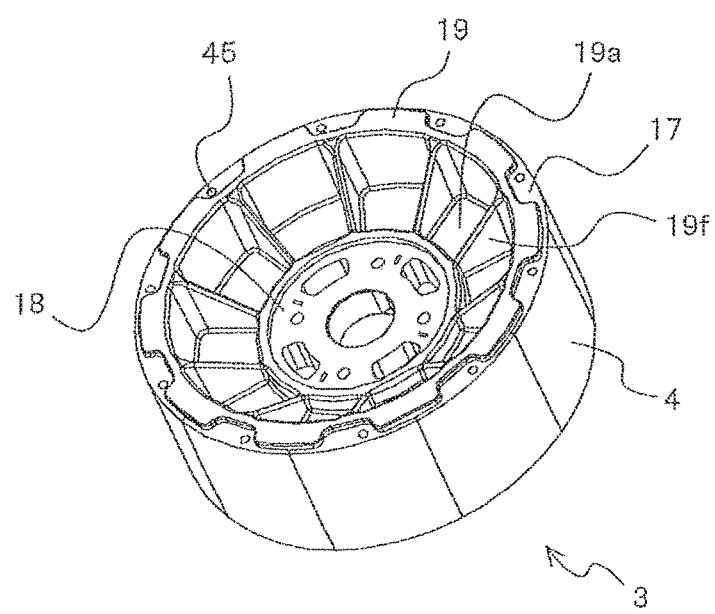
FIG. 3A is a perspective view of the rotor of FIG. 1.
Figure 3B:
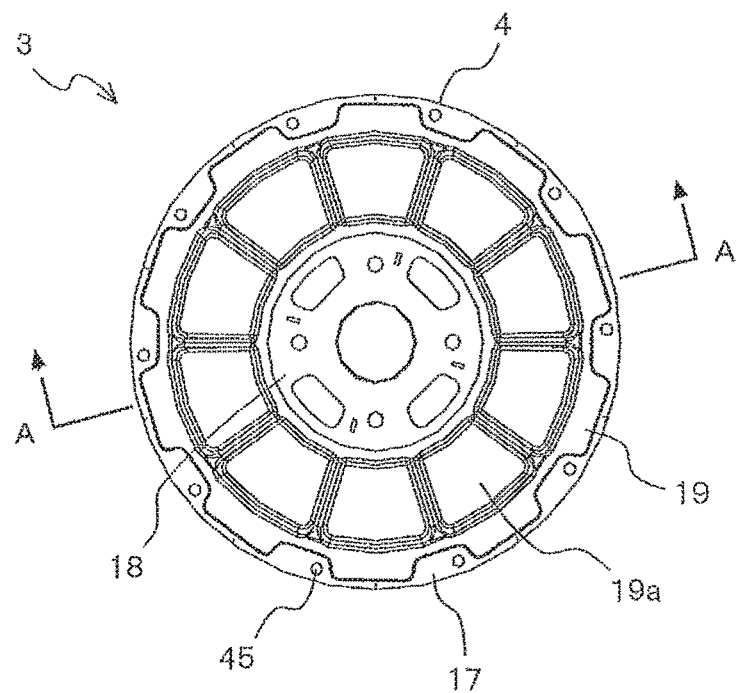
FIG. 3B is a plan view of the rotor of FIG. 3A.

FIGS. 2A and 2B are a perspective view and a schematic end view in the state in which magnets 20 are bonded to the circumference of the rotor 3 and the shaft 8 is inserted. FIGS. 3A and 3B are a perspective view and a plan view of the rotor 3. The rotor 3 includes a boss 18 that is an inner-diameter-side iron core and into which the shaft 8 is inserted, a rotor yoke 17 provided on a side of an outer circumference of the boss 18 and formed of a plurality of pole pieces 4 connected into a circular ring shape, and a coupling member 19 made of resin with which the boss 18 and the rotor yoke 17 are integrally molded.

The magnets 20 that are permanent magnets are bonded to an outer circumferential surface of the rotor yoke 17. The magnets 20 are, using a jig (not shown), bonded to the outer circumferential surface of the rotor yoke 17 at predetermined pitches. An adhesive, for example, is used for bonding the magnets 20. The boss 18 is thinner than the rotor yoke 17. The center position of the rotor yoke 17 and the center position of the boss 18 are arranged at the same position in an axial direction. The rotor yoke 17 is provided with positioning holes 45 used for positioning in integral molding of the rotor yoke 17 and the boss 18.

Figure 4A:
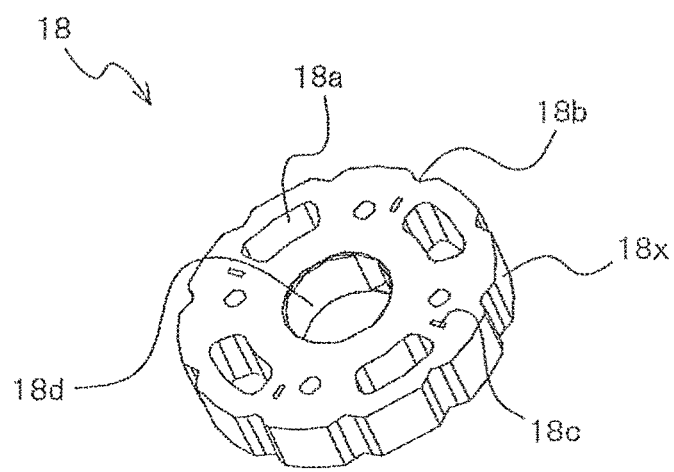
FIG. 4A is a perspective view of a boss as an inner-diameter-side iron core of the rotor of FIG. 3A.
Figure 4B:
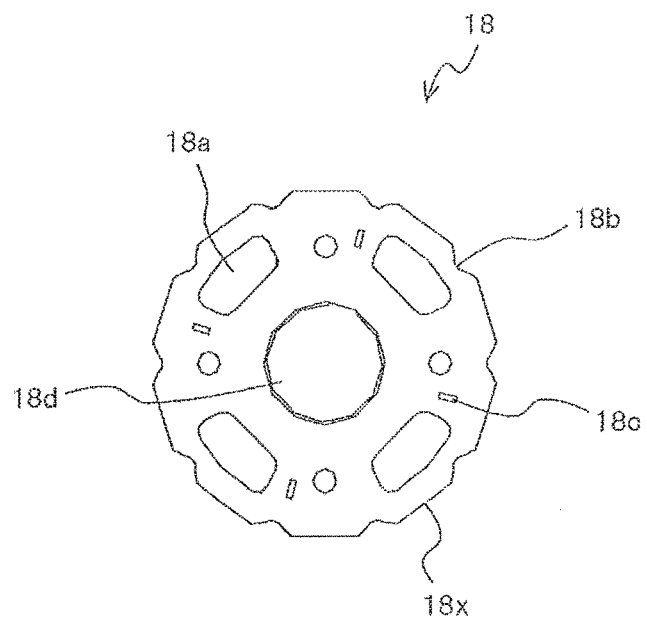
FIG. 4B is a plan view of the boss of FIG. 4A.

FIGS. 4A and 4B are a perspective view and a plan view of an example of the boss 18 as the inner-diameter-side iron core of the rotor 3. The boss 18 has a smaller outer diameter than the inner diameter of the rotor yoke, and is provided with a plurality of trapezoidal boss holes 18a. Boring the boss holes 18a reduces the weight of the boss 18, and consequently, the inertia moment of the rotor 3 can be reduced. Also, the boss 18 has an outer circumferential surface having a plurality of concave portions 18b. Note that FIGS. 4A and 4B illustrate the example where the four boss holes 18a are each provided at a separate position and the ten concave portions 18b are each provided at a separate position.

Figure 5:
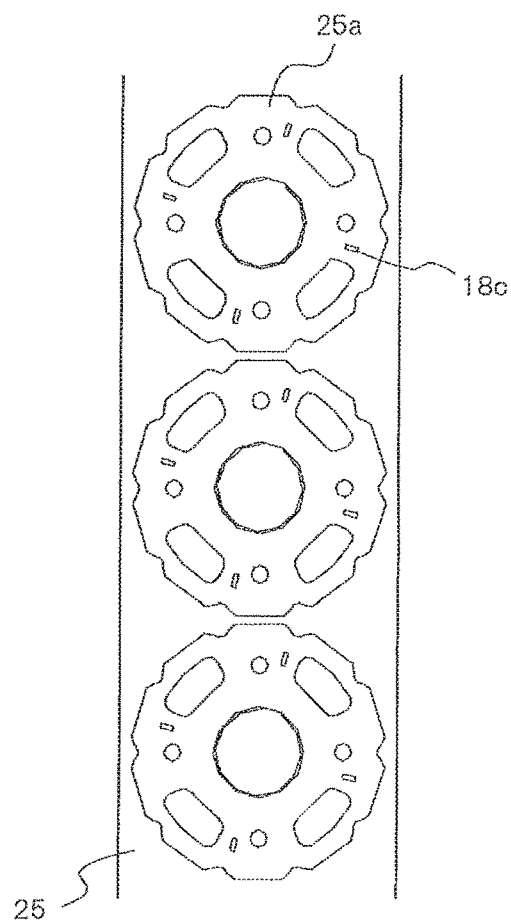
FIG. 5 is a view for describing a punching pattern of a sheet for formation of the boss of FIG. 4A.

FIG. 5 is a view for describing a punching pattern of a sheet for formation of the boss 18. In FIG. 5, a boss core sheet 25 is a sheet for formation of the boss 18. That is, the boss 18 is a multi-layer iron core formed by punching out a plurality of boss sheet pieces 25a from the boss core sheet 25 by a mold (not shown), stacking the plurality of boss sheet pieces 25a on each other, and fixing the plurality of boss sheet pieces 25a together at swaged portions 18c. The boss 18 has a center portion having an insertion hole 18d into which the shaft 8 is inserted.

Figure 6A:
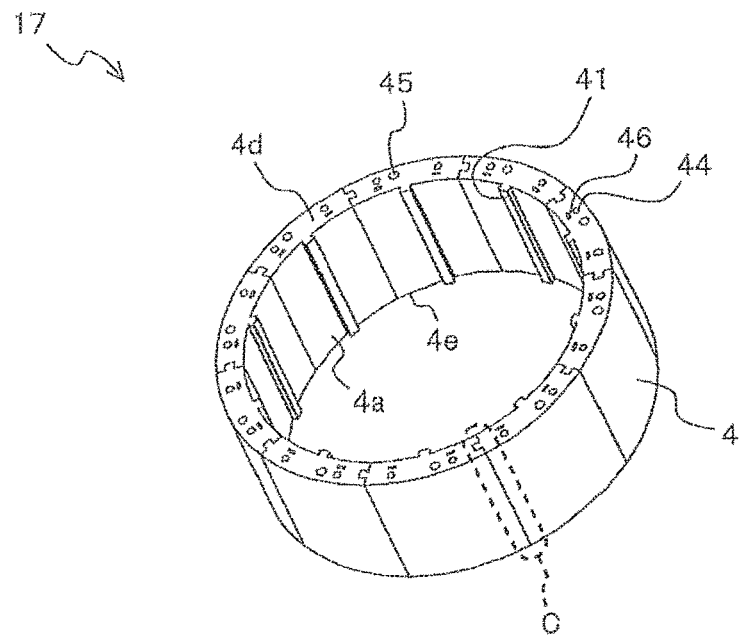
FIG. 6A is a perspective view of a rotor yoke as an outer-diameter-side iron core of the rotor of FIG. 3A.
Figure 6B:
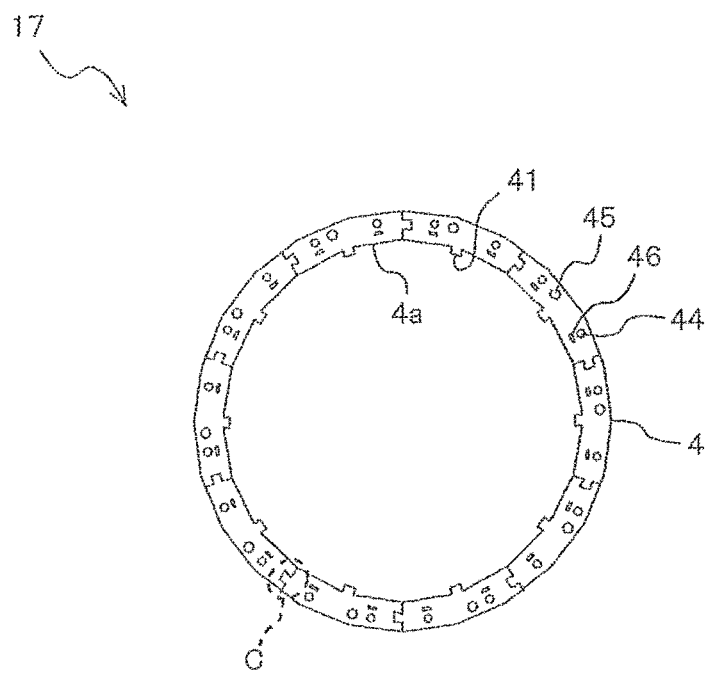
FIG. 6B is a plan view of the rotor yoke of FIG. 6A.
Figure 7:
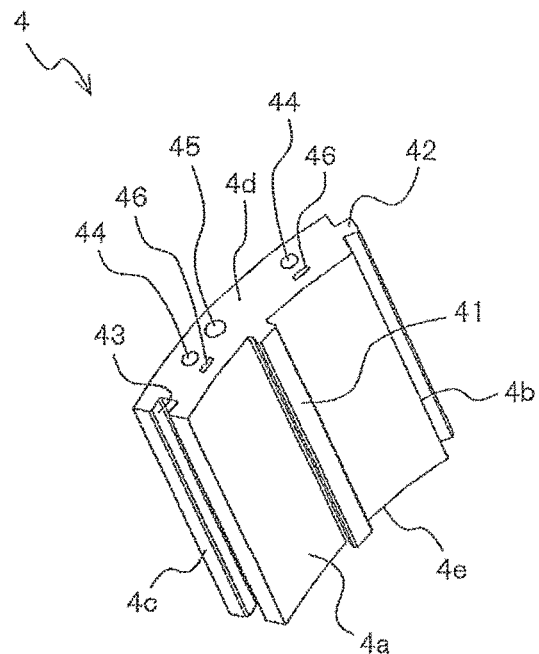
FIG. 7 is a perspective view of a pole piece forming the rotor yoke of FIG. 6A.

FIGS. 6A and 6B are a perspective view and a plan view of the rotor yoke 17 as an outer-diameter-side iron core of the rotor 3. FIG. 7 is a perspective view of the pole piece 4 forming the rotor yoke 17 of the side of the outer diameter. The rotor yoke 17 is formed of the plurality of pole pieces 4.

Each pole piece 4 is a multi-layer iron core formed by stacking a plurality of sheets having swaged portions 46 on each other in the axial direction of the shaft 8 and fixing the plurality of sheets at the swaged portions 46. Each pole piece 4 has an inner-diameter-side surface 4a having an inner-diameter-side convex portion 41. Also, the pole piece 4 has a first side end surface 4b having a convex portion 42, and a second side end surface 4c having a concave portion 43. Also, the pole piece 4 has end surfaces 4d and 4e having injection holes 44 bored in the axial direction of the shaft 8 (a stacking direction) and the positioning hole 45 for positioning the rotor yoke 17. That is, the rotor yoke 17 is formed of the plurality of pole pieces 4 (for example, ten pole pieces 4) connected into a circular ring shape in a circumferential direction. Specifically, the convex portion 42 and the concave portion 43 of adjacent ones of the pole pieces 4 engage with each other to connect the pole pieces 4 into the circular ring shape. Thus, the swaged portions 46 are, as a whole, arranged in a circular ring shape.

Each injection hole 44 is a through-hole, for example. In particular, in the rotor yoke 17, each injection hole 44 is provided on a side of the outer circumference of each swaged portion 46. When the rotor yoke 17 and the boss 18 are integrally molded, resin forming the coupling member 19 is injected in each injection hole 44. As each injection hole 44 is provided on the side of the outer diameter of each swaged portion 46, the position of each swaged portion 46 serves as the point of support in a contraction balance between resin on the side of the inner diameter of the rotor yoke 17 and resin injected in each injection hole 44, and consequently, the cylindricality of the rotor 3 can be improved.

For a positional relation between the injection holes 44 and the swaged portions 46, the center of each injection hole 44 is only required to be positioned on the side of the outer circumference of the center of each swaged portion 46. Also, the number of injection holes 44 and the number of swaged portions 46 may be set arbitrarily, and these numbers are not necessarily equal to each other. For example, a single injection hole 44 and a single swaged portion 46 may be provided at a center portion of the pole piece 4. Alternatively, an oval injection hole extending along the circumferential direction of the pole piece 4 may be provided for a plurality of swaged portions 46, or a different number of pole pieces 4 from the number of swaged portions 46 may be provided in a balanced manner. Note that the injection holes 44 are not necessarily positioned on the side of the outer circumference of the swaged portions 46.

The injection holes 44 and the swaged portions 46 are each provided between the center of the pole piece 4 and each of the convex portion 42 and the concave portion 43, and the injection hole 44 and the swaged portion 46 are provided on the same line in the radial direction of the rotor yoke 17. With such a configuration, each swaged portion 46 more effectively serves as the point of support in the contraction balance between the resin on the side of the inner diameter of the rotor yoke 17 and the resin injected in each injection hole 44, and consequently, lowering of the accuracy of the shape of the rotor 3 can be reliably reduced.

Figure 8:
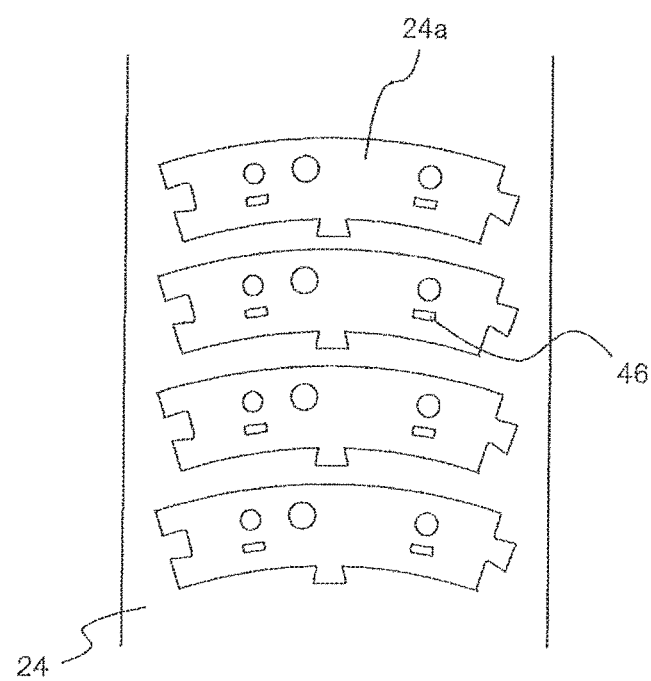
FIG. 8 is a view for describing a punching pattern of a sheet for formation of the pole piece of FIG. 7.

FIG. 8 is a view for describing a punching pattern of a sheet for formation of the pole piece 4. A pole piece core sheet 24 is illustrated as a sheet for formation of the rotor yoke 17. That is, the pole piece 4 is formed by punching out a plurality of pole piece sheet pieces 24a from the pole piece core sheet 24 by a mold (not shown), stacking the plurality of pole piece sheet pieces 24a on each other, and fixing the plurality of pole piece sheet pieces 24a at the swaged portions 46. The rotor yoke 17 is formed of the pole pieces 4 combined together. The pole piece sheet pieces 24a are each in an arc shape. The pole piece sheet pieces 24a can be continuously punched out from the pole piece core sheet 24, and thus, the material yield rate of the rotor 3 can be improved.

As the boss core sheet 25 of FIG. 5 and the pole piece core sheet 24 of FIG. 8 can be separate sheets, the material and thickness of each of the boss core sheet 25 and the pole piece core sheet 24 can be optionally changed. That is, the boss core sheet 25 and the pole piece core sheet 24 made of different materials and having different thicknesses can be optionally employed. Combining the rotor yoke 17 and the boss 18 made of different materials or having different strengths or other characteristics can form the rotor 3 based on design contents.

Figure 9:
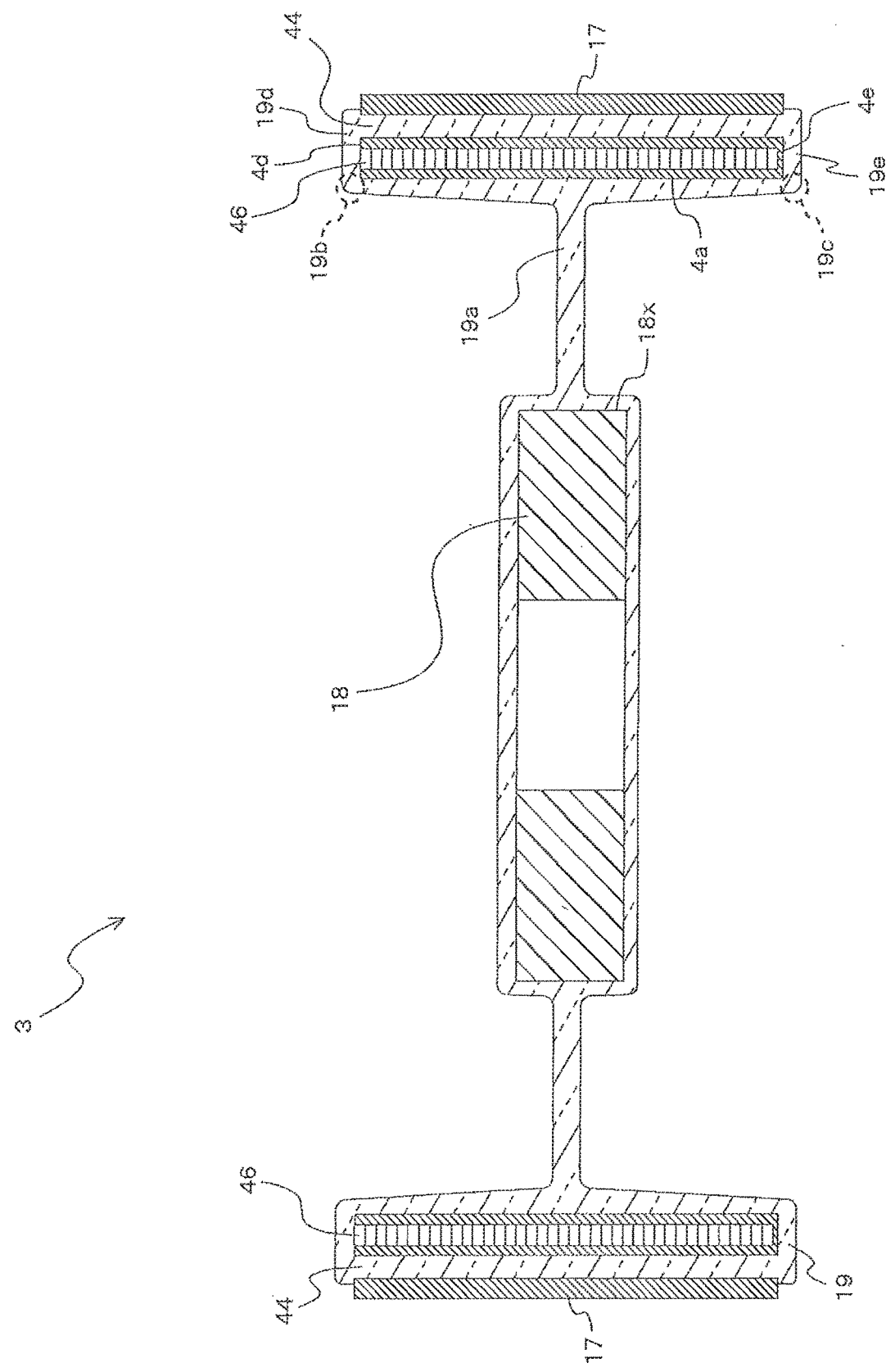
FIG. 9 is a schematic sectional view along A-A line of FIG. 3B.

FIG. 9 is a schematic sectional view along A-A line of FIG. 3B. The coupling member 19 is made of resin, and is configured to couple the pole pieces 4 and the boss 18 together. The coupling member 19 is integrally molded (mold formation) to cover the swaged portions 46 and the injection holes 44. The coupling member 19 includes joint portions 19a joining between an outer circumferential surface 18x of the boss 18 and the inner-diameter-side surface 4a of each pole piece 4 as an inner circumferential surface of the rotor yoke 17. The coupling member 19 further includes a first covering portion 19d and a second covering portion 19e each extending from a first end portion 19b and a second end portion 19c that are end portions of the joint portion 19a in the axial direction and each covering the end surface 4d and the end surface 4e that are the end surfaces in the axial direction of the rotor yoke 17. The first covering portion 19d and the second covering portion 19e are coupled with the resin in the injection hole 44. The joint portion 19a is formed to have a uniform thickness between the boss 18 and the rotor yoke 17. The coupling member 19 includes ribs 19f radially arranged at equal intervals (see FIG. 3A).

The coupling member 19 is molded to cover the swaged portions 46 and the injection holes 44 provided on sides of connection portions C (see FIG. 6A) of each pole piece 4 forming the rotor yoke 17. On the other hand, the coupling member 19 is in such a shape that each positioning hole 45 into which a positioning pin is inserted in integral molding is exposed. Also, the coupling member 19 couples the rotor yoke 17 and the boss 18 so that each inner-diameter-side convex portion 41 (see FIG. 6A) of the rotor yoke 17 faces a corresponding one of the concave portions 18b of the boss 18. As the rotor yoke 17 and the boss 18 are integrally molded with each inner-diameter-side convex portion 41 facing a corresponding one of the concave portions 18b, strength against rotation is added to the rotor 3 and the rotating motor 1 is stabilized.

As illustrated in FIG. 9, in mold formation, the resin forming the coupling member 19 not only flows between the rotor yoke 17 and the boss 18, but also flows into the injection holes 44. Thus, the coupling member 19 is formed to sandwich the swaged portions 46 from the sides of the inner and outer diameters. In particular, in Embodiment, as the injection holes 44 and the swaged portions 46 are provided at two positions on the sides of the connection portions C of each pole piece 4, the coupling member 19 is formed to surround the swaged portions 46 from the sides of the inner and outer diameters.

In integral molding of the rotor 3 in Embodiment, contraction of the resin forming the coupling member 19 provides contraction pressure not only on the side of the inner diameter of the swaged portions 46 of the rotor yoke 17 but also the side of the outer diameter of the swaged portions 46 of the rotor yoke 17. Thus, lowering of the cylindricality of the outer diameter of the rotor yoke 17 due to resin contraction can be reduced. Note that, in FIG. 9, the case where each injection hole 44 penetrates in the axial direction has been described, but the present invention is not limited to such a case. Each injection hole 44 may be bored as a hole axially extending from at least one of the end surfaces 4d and 4e of the rotor yoke 17 that are the end surfaces in the axial direction of the rotor yoke 17.

Also, the coupling member 19 is provided with non-penetrating holes each surrounded by the joint portion 19a and the ribs 19f. That is, the joint portion 19a does not penetrate, and has the uniform thickness. As a result, the thickness of the coupling member 19 is uniform. With this configuration, imbalance contraction of the coupling member 19 made of resin is reduced, and molding can be stabilized.

Figure 10:
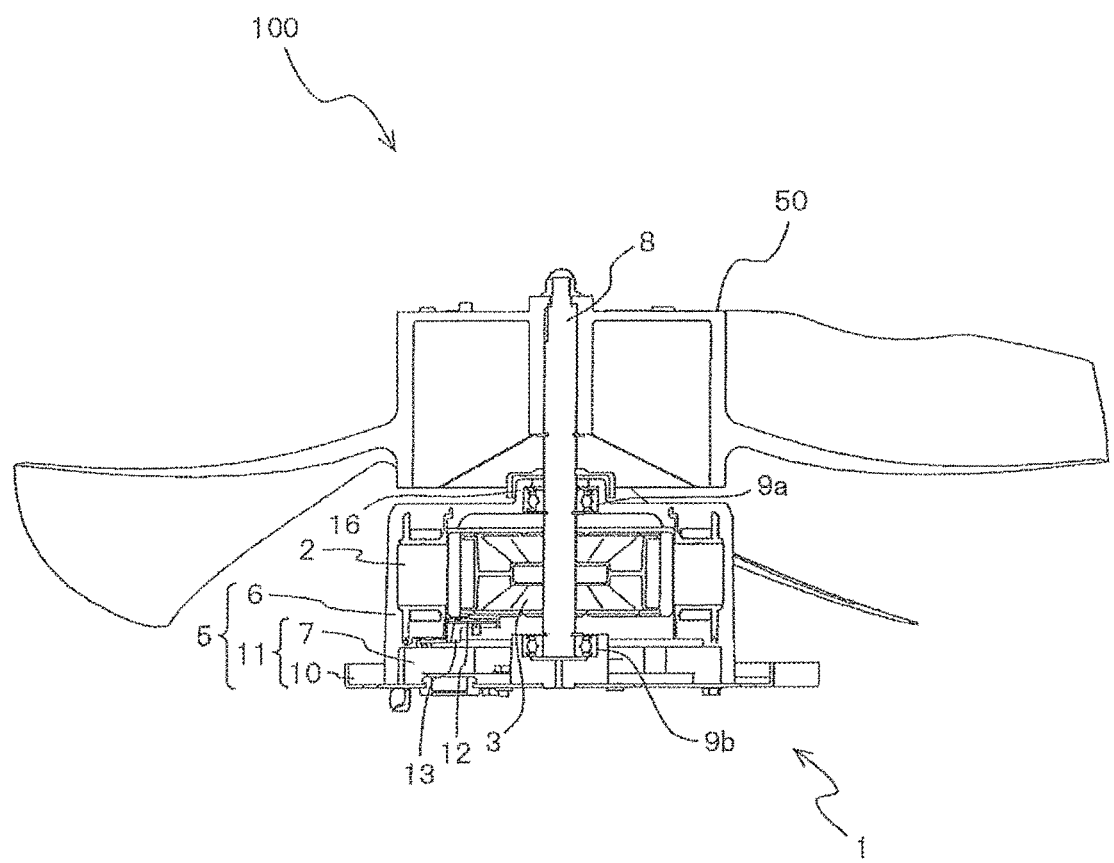
FIG. 10 is a schematic view in the state in which a propeller fan as a driven machine is coupled to the rotating motor of FIG. 1.

FIG. 10 is a schematic view in the state in which a propeller fan 50 as a driven machine of the rotating motor 1 is coupled. That is, an air-conditioning apparatus 100 of Embodiment at least includes the propeller fan 50 of an outdoor unit and the rotating motor 1 configured to drive the propeller fan 50. A tip end portion of the shaft 8 is coupled to the propeller fan 50, and the propeller fan 50 is used as a fan configured to send air to a heat exchanger. Note that, in Embodiment, the propeller fan 50 has been described as an example, but the present invention is not limited to the propeller fan 50. A fan of another type based on the intended use may be employed. That is, a sirocco fan or a turbo fan may be employed instead of the propeller fan 50, for example.

Advantageous Effects of Embodiment

In the configuration in Embodiment, the injection holes 44 are provided on the side of the outer diameter of the swaged portions 46 of each pole piece 4 that is a divided piece of the circular ring-shaped rotor yoke 17 in the rotor 3 formed by integral molding of the rotor yoke 17 and the boss 18 with resin, and the resin flows into the injection holes 44 in integral molding. Thus, not only stress due to resin contraction on the side of the inner diameter but also stress due to contraction of resin filling the injection holes 44 act on each pole piece 4 in integral molding. For this reason, excessive contraction deformation in the outer diameter cross section of the rotor yoke 17 is reduced, and the cylindricality of the rotor 3 can be improved.

In the case where the injection holes 44 are provided on the side of the outer circumference of the swaged portions 46, the position of each swaged portion 46 serves as the point of support in the contraction balance between resin on the side of the inner diameter of the rotor yoke 17 and resin injected in the injection holes 44, and consequently, cylindrical accuracy of the rotor yoke 17 can be improved. That is, the influence of resin contraction can be reduced in integral molding with resin, and lowering of the cylindricality of the rotor 3 can be reduced. Thus, a risk due to divided core formation can be avoided, and a material cost can be reduced.

In addition, as the coupling member 19 is interposed between the rotor yoke 17 and the boss 18, the rotor yoke 17 and the shaft 8 are insulated from each other. Thus, a current generated at the rotor yoke 17 is not transmitted to an output shaft, and occurrence of electrical corrosion of a bearing, for example, resulting in noise can be reduced. Consequently, the material cost of the rotor 3 of the rotating motor 1 can be reduced, and a rotor of a rotating motor and an air-conditioning apparatus that are inexpensive and highly accurate can be provided.

Note that Embodiment described above includes preferable specific examples of the rotor of a rotating motor, the rotating motor, and the air-conditioning apparatus, and may be subjected to various technically-preferable limitations. However, the technical scope of the present invention is not limited to Embodiment as long as the present invention is not specifically limited by description. For example, the example where the pole piece 4 has, at two positions, the injection holes 44 and the swaged portions 46 is shown in FIG. 7, but the number and shape of swaged portions and the number and shape of the injection holes may be optionally changed depending on design contents. That is, the swaged portion 46 may be in a circular shape, and the injection hole 44 may be in a rectangular shape. Also, the position of each injection hole 44 is not limited to the position illustrated in FIG. 7, and the configuration can be broadly employed in which the center of the injection hole 44 is disposed on the side of the outer diameter of the center position of the swaged portion 46.

In FIG. 7, the case where the inner-diameter-side convex portion 41 is formed on the side of the inner diameter of the pole piece 4 has been described as an example, but the present invention is not limited to such a case. Instead of the inner-diameter-side convex portion 41, a male dovetail groove may be formed. Also, the rotor yoke 17 in FIG. 6A includes a combination of ten pole pieces 4, but any number of pole pieces may be combined together to form the rotor yoke.

In Embodiment, the example where the coupling member 19 is in a flower shape covering the injection holes 44 and the swaged portions 46 has been described, but the present invention is not limited to such a shape. For example, the coupling member 19 may be formed to cover an entire portion (an entire end surface in the stacking direction) except for the positioning holes 45, or may be formed to cover the injection holes 44 and the swaged portions 46 or cover only the injection holes 44. Also, the injection hole 44 may be, as described above, in a shape penetrating the rotor yoke 17 in the axial direction as illustrated in FIG. 9, or may be a hole bored to axially extend from each end surface in the axial direction of the rotor yoke 17. That is, the coupling member 19 may be in such a shape that resin at each end surface in the axial direction of the rotor yoke 17 is coupled with resin in the injection holes 44. In addition, in Embodiment, thermoplastic resin is employed as mold formation resin for the coupling member 19, but thermosetting resin may be employed.

REFERENCE SIGNS LIST 1 rotating motor, 2 stator, 3 rotor, 4 pole piece, 4a inner-diameter-side surface, 4b first side end surface, 4c second side end surface, 4d, 4e end surface, 5 motor housing, 6 casing, 7 bearing housing, 8 shaft, 9a first bearing, 9b second bearing, 10 metal plate cover, 11 bracket cover, 12 printed circuit board, 13 board holder, 16 bottom wall portion, 17 rotor yoke, 18 boss, 18a boss hole, 18b concave portion, 18c swaged portion, 18d insertion hole, 18x outer circumferential surface, 19 coupling member, 19a joint portion, 19b first end portion, 19c second end portion, 19d first covering portion, 19e second covering portion, 19f rib, 20 magnet, 24 pole piece core sheet, 24a pole piece sheet piece, 25 boss core sheet, 25a boss sheet piece, 41 inner-diameter-side convex portion, 42 convex portion, 43 concave portion, 44 injection hole, 45 positioning hole, 46 swaged portion, 50 propeller fan, 100 air-conditioning apparatus

The invention claimed is:

1. A rotor of a rotating motor, comprising:
a boss into which a shaft is inserted;
a rotor yoke provided on a side of an outer circumference of the boss and formed of a plurality of pole pieces connected into a circular ring shape; and
a coupling member made of resin with which the boss and the rotor yoke are integrally molded, wherein
each of the pole pieces is provided with an injection hole that extends in an axial direction of the rotor,
each of the pole pieces is formed of a plurality of sheets stacked on each other, each of the sheets includes a swaged portion at which the sheets are fixed to one another,
the injection hole is located on a radially outer side of the swaged portions,
the coupling member includes a joint portion provided on a radially inner side of the rotor yoke,
the coupling member is configured to join an outer circumferential surface of the boss and an inner circumferential surface of the rotor yoke,
the resin is located in the injection holes,
the swaged portion and the injection hole are aligned in a radial direction of the rotor yoke, and
the swaged portion and the injection hole lie on a radius of the rotor.

2. The rotor of a rotating motor of claim 1, wherein
the swaged portion is a first swaged portion,
each of the plurality of sheets includes a second swaged portion,
each of the pole pieces is provided with a second injection hole, which extends in an axial direction and is located on a radially outer side of the second swaged portions, and
resin is located in the second injection hole.

3. The rotor of a rotating motor of claim 1, wherein
the boss is formed of a plurality of sheets stacked on each other and fixed together, and
the sheets of the pole pieces have a different thickness from the sheets of the boss.

4. The rotor of a rotating motor of claim 1, wherein the coupling member includes a covering portion extending from each end portion of the joint portion in the axial direction to cover an end surface of the rotor yoke in the axial direction, and wherein the covering portion is coupled to the resin in the injection hole.

5. The rotor of a rotating motor of claim 1, wherein the joint portion is formed to have a uniform thickness from the boss to the rotor yoke.

6. The rotor of a rotating motor of claim 1, wherein the resin comprises thermoplastic resin or thermosetting resin.

7. A rotating motor comprising:
the rotor of claim 1;
the shaft inserted into the boss; and
a magnet provided on an outer circumferential surface of the rotor yoke.

8. An air-conditioning apparatus comprising:
the rotating motor of claim 7; and
a propeller fan mounted on the rotating motor.

\* \* \* \* \*